3,271,162
PROCESS FOR SEGREGATING LUPULIN
FROM DRIED HOPS
Laurence R. Bishop, Mortlake, England, assignor to Watney Combe Reid & Company Limited, London, England
Filed Mar. 20, 1963, Ser. No. 266,654
Claims priority, application Great Britain, Mar. 21, 1962, 10,797/62
2 Claims. (Cl. 99—50.5)

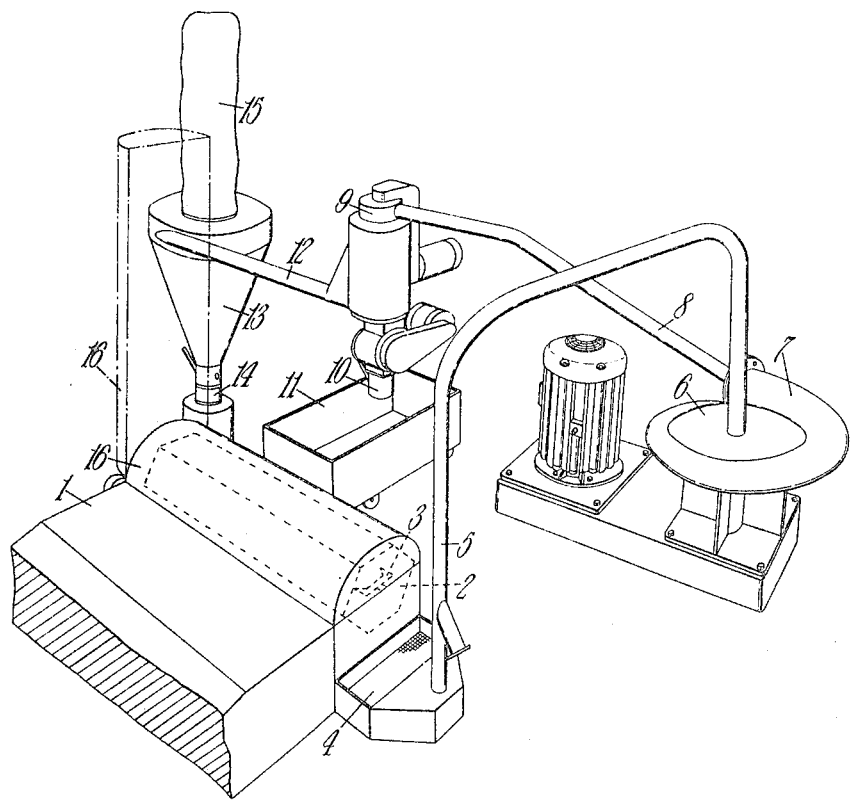

This invention relates generally to the brewing of beer and in particular to the preparation of hops for use in beer brewing.

It is well known that the principal active ingredients in hops are concentrated in the so-called lupulin granules which appear around the base of the bracts, and on the surface of the bracteoles as well as around the seeds where the development of seeds is permitted. These granules, which are generally of a yellow color, are somewhat sticky because of their substantial content of soft resins and hop essential oil. Although it is possible to shake out quite an appreciable amount of lupulin granules (the resulting powder generally being referred to as lupulin), there has in the past been no really satisfactory method for effecting an extensive separation of these granules from the accompanying plant tissue.

There are many serious disadvantages arising from the use of whole hops, of which perhaps the most serious is the deterioration of the active material in storage. The hops are first dried and then baled, and it is often several months or even much longer before they are used either for boiling with the wort or for adding to the beer (dry hopping) for flavoring purposes. The active materials which are of principal importance in the first mentioned stage are the so-called alpha and beta resin acids which (directly or indirectly) are responsible for the characteristic bitter taste and at the same time act as antiseptics, preventing spoilage of the wort and resulting beer. During storage of the hops there is a progressive conversion of the alpha resin acids, largely to materials which are relatively inactive. This change represents a serious and progressive loss. Satisfactory storage conditions are difficult to install and maintain because of the very large bulk involved, and for the same reason it is not commercially feasible to subject the hops to an efficient extraction or distillation process for the isolation of the active principles. In the dry hopping stage, it is the hop essential oils which are of principal importance, and although these can be isolated from the hops by steam distillation and other means (hop oils being commercially available), the extraction is rather tedious, and the resulting oil correspondingly expensive, with the process being perhaps comparable with the isolation of perfume ingredients from dried flowers. The large bulk of the hops to be treated makes it difficult to avoid deterioration during such distillation processes. Yet another disadvantage arising from the use of whole hops is that the seed has generally to be avoided, since it causes stoppages in the various pipe lines.

It is a principal object of the invention to enable a relatively concentrated form of lupulin to be separated from the dried hops. This concentrated material can then either be used as such, for boiling with wort or for adding to the brewed beer, or it can be subjected to extraction processes for the isolation of the respective active ingredients which can then be stored, with or without stabilization, until they are required for use. By isolating the lupulin in a relatively concentrated form, its storage under conditions which will preclude or minimize spoilage becomes very much easier and less expensive, while at the same time the large storage space hitherto required is freed for other purposes.

According to the invention, the dried hops are subjected to breaking-down in a pin mill, after which the broken down material is sifted to separate the fines, representing the relatively concentrated lupulin, from the coarser particles of plant tissue. According to a further feature of the invention, the sifting is effected in a turbine sifter. This has been found to be particularly suitable, but other methods may be adopted, for example, gravitational or centrifugal sieving or air sifting.

It has been discovered that by the use of a pin mill and especially by the use in conjunction of a pin mill and a turbine sifter, that it is possible to effect a high degree of concentration of the lupulin granules in the fines from the sifter despite the rather sticky nature of the granules. The hops (by which it will be understood the dried hop cones) used as feed for the pin mill may for example have a moisture content between 8% and 12% by weight.

It will be appreciated that, in the process of this invention, seed bearing hops can be employed without detriment.

The concentrated lupulin product is of especial value at the dry hopping stage, although of course it may be of great advantage generally as a source of the bittering principles also required in the brewing of beer. Particular benefits would arise if the conversion of the alpha acids to iso humulones were effected prior to the addition to the wort, the addition then being made after the boiling stage. Ordinarily, especially with chilled beer, an inordinately prolonged soaking period is required if the assimilation of the hop oil into the beer is to be at all complete. This assimilation is very greatly speeded by the use of the powdery concentrate obtained in accordance with the invention although, of course, if desired, the essential oil can first be isolated by steam distillation or otherwise and added as such to the beer. At the same time, the wastage of duty-paid beer arising from its absorption by the dry hop bracts, is avoided.

Pin mills and turbine and other sifters are in themselves well known articles of commerce and it does not appear necessary to describe them further. The particular screen size employed in the turbine sifter will depend to some extent on the character and speed of operation of the pin mill, and to some extent on the compromise which is to be struck between the concentration of lupulin in the end product, and the degree of recovery of the lupulin from the original hops.

The invention will be described further with reference to the accompanying drawing, which is a perspective view of a suitable lay-out of apparatus for recovering lupulin from dried hops.

The apparatus comprises a loading platform 1 adjacent to a rotary screen or trommel 2. The latter, in the form of a polygonal prism, rotates about an axis which is inclined slightly towards one end where a stationary fork 3 is located. A pair of adjacent sides of the screen 2 is detachable for loading purposes, with access to the same being had by means of a hinged lid 16. In operation, a bale of dried hops is loaded into the screen 2 which is then rotated slowly so that the bracts and other parts of the dried hops fall through onto a belt-type conveyor (not shown). The conveyor, driven by the same motor (also not shown) as the screen 2, discharges the loosened hops into a bin 4. Any other convenient form of apparatus may be used for breaking up the compressed dried hops and, where the recovery of the lupulin is practiced (as is desirable) in the vicinity of the hop drying apparatus, the dried but uncompressed hops may be treated directly.

The dried hops are now drawn by an air stream into and along a feed pipe 5 leading to a pin disc mill 6. The particular mill illustrated, being one which is commercially available, is fitted with an involute delivery ring 7 leading to a further pipe 8. The latter pipe conveys the lupulin and disintegrated bracts to a turbine sifter 9 being, likewise, a commercially available article. In the turbine sifter, the lupulin and disintegrated bracts are directed by impeller blades against an internal screen and by the same action the air current is generated which serves to convey the dried hops from the bin 4, through the pin disc mill 6 to the turbine sifter. The sifter has an outlet 10 leading to a bin 11 for coarse residue, and a second outlet 12 for fines (lupulin). From the outlet 12, the lupulin passes to a cyclone separator 13 furnished with an outlet valve 14 for the lupulin and the usual filter bag 15.

The invention is not to be confined to the precise showings of the drawings since changes or modifications may be made therein so long as such changes or modifications mark no material departure from the spirit and scope of the appended claims.

I claim:

1. A process for segregating lupulin from dried hops, which comprises the steps of disintegrating the hops in a pin mill, and sifting the lupulin from the discarded plant tissue in a turbo-sifter.

2. A process for segregating lupulin from dried hops, which comprises the steps of disintegrating the hops in a pin mill, and sifting the lupulin from the discarded plant tissue in a turbo-sifter with the suction developed by the turbo-sifter drawing the dried hops into and through the pin mill.

References Cited by the Examiner

UNITED STATES PATENTS

| | | | |
|---|---|---|---|
| 121,902 | 12/1871 | Seeger et al. | 99—50.5 |
| 428,101 | 5/1890 | Irlbacker | 99—278 |
| 496,752 | 5/1893 | Schweissinger | 99—50.5 |
| 1,092,538 | 4/1914 | Rauch | 99—278 |
| 2,181,931 | 12/1939 | Wood | 99—50.5 |
| 2,833,652 | 5/1958 | Naatz | 99—50.5 |
| 2,898,209 | 8/1959 | Murtough | 99—50.5 |
| 3,079,262 | 2/1963 | Hougen | 99—50.5 |

A. LOUIS MONACELL, *Primary Examiner.*

D. M. STEPHENS, *Assistant Examiner.*